(12) United States Patent
Kremin (10) Patent No.: US 9,733,745 B1
(45) Date of Patent: Aug. 15, 2017

(54) PRESSURE DETECTION SYSTEM FOR TOUCH-SENSE DEVICES

(75) Inventor: Victor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 1980 days.

(21) Appl. No.: 11/968,119

(22) Filed: Dec. 31, 2007

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01)

(58) Field of Classification Search
CPC ....... G06F 3/0414; G06F 3/0416; G06F 3/044
USPC .................................................. 345/173–178
See application file for complete search history.

(56) References Cited

U.S. PATENT DOCUMENTS

| | | | |
|---|---|---|---|
| 5,488,204 A * | 1/1996 | Mead ...................... | G06F 3/041 178/18.06 |
| 5,543,591 A * | 8/1996 | Gillespie ................. | G06F 3/038 178/18.03 |
| 5,844,506 A * | 12/1998 | Binstead .......................... | 341/34 |
| 6,657,614 B1 * | 12/2003 | Ito et al. ....................... | 345/168 |
| 2006/0109252 A1 * | 5/2006 | Kolmykov-Zotov et al. .............................. | 345/173 |
| 2006/0284858 A1 * | 12/2006 | Rekimoto ..................... | 345/173 |
| 2007/0020437 A1 * | 1/2007 | Yamauchi et al. ............ | 428/151 |
| 2009/0284475 A1 * | 11/2009 | Nashiki et al. ............... | 345/173 |
| 2010/0066697 A1 * | 3/2010 | Jacomet ................ | G06F 3/0414 345/173 |
| 2013/0154983 A1 * | 6/2013 | Christiansson ....... | G06F 3/0416 345/173 |

FOREIGN PATENT DOCUMENTS

WO   PCT/JP2006/317055   * 8/2006

* cited by examiner

*Primary Examiner* — Jonathan Horner (57) ABSTRACT

A touch-sense device includes an overlay, such as a rough overlay or a compliant overlay, on a sensing layer. Use of the overlay changes a response of the sensing layer so that a light press is more distinguishable from a strong press by sensing electronics. Distinguishing the light press from the strong press enables the sensing electronics to report additional information in response to a press. In one example, a sensor signal of the sensing layer attains a first magnitude for a light press, and a second magnitude for a strong press, enabling the strong press to be distinguished. In another example, a sensor signal has a second edge in response to a strong press, and detection of the second edge enables the strong press to be distinguished. In various embodiments, a surface of the overlay has protrusions and/or cavities and/or is compressible.

15 Claims, 8 Drawing Sheets

PRESSURE DETECTION SYSTEM FOR TOUCH-SENSE DEVICES

FIELD OF THE INVENTION

The present disclosure relates generally to touch-sense devices, such as touch screens, touch pads, sliders, or buttons.

BACKGROUND

Some electronic devices use touch-sense devices, such as touch screens, touch pads, sliders, or buttons, to provide input. A button provides a binary indication (on or off). A slider provides a one-dimensional indication (a value in a range between a minimum value and a maximum value). A touch screen (or touch pad) provides a two-dimensional indication (both an X dimension value and a Y dimension value). Some touch screens are implemented using approaches equivalent to that of two orthogonal sliders. Other touch screens use an array of sensors, such as an array of capacitive sensors.

Some touch-sense devices, such as a button, use mechanical switches. Some touch-sense devices use other techniques, such as a slider which acts as a resistive divider around a point of touch, enabling a calculation of a location of the point of touch by measurement of resistance. Some touch-sense devices use capacitive techniques to measure the location of the point of touch. Some touch-screen devices use current sensing (such as measuring, at each of the four corners of the screen, current drawn through a finger touching the screen), or acoustical techniques (such as surface acoustic wave techniques).

Some existing touch-sensing devices, such as some button devices, incorporate a mechanical layer having switches below a capacitance-sensing layer. A light press triggers only the capacitance-sensing layer, while a strong press also triggers the switches, thus enabling a light press to be distinguished from a strong press, and enabling the touch-sensing devices to report additional information (not solely an occurrence of a press, but also a type of the press). Approaches such as this, however, are limited in scalability because of the use of mechanical switches (which are generally poorer at fine-grained position detection), and are also expensive due to the need to integrate two different types of sensors (such as mechanical and capacitance-sensing).

SUMMARY

In some embodiments, a method of operating a touch-sense device comprises: computing a function of one or more sensor signals from the touch-sense device; detecting a threshold crossing on the function of the one or more sensor signals, the threshold crossing corresponding to a light press on a surface of the touch-sense device; subsequent to the detecting the threshold crossing, detecting an event on the function of the one or more sensor signals, the event corresponding to a strong press on the surface of the touch-sense device; where the strong press applies more force to the surface of the touch-sense device than the light press; and reporting, in response to the detecting the event, the strong press. In some embodiments of the method, a magnitude of difference between a first threshold of the function of the one or more sensor signals corresponding to the light press and a second threshold of the function of the one or more sensor signals corresponding to the strong press is due, at least in part, to a rough overlay of the surface of the touch-sense device. In some embodiments of the method, the threshold crossing comprises a first threshold crossing, and the event comprises second threshold crossing. In some embodiments of the method, the event comprises an edge on the function of the one or more sensor signals. In some embodiments of the method, a magnitude of the function of the one or more sensor signals is proportional to a surface area of the rough overlay in proximity to a finger. Various embodiments of the method further comprise delaying for a predetermined amount of time after the detecting the threshold and before the detecting the event. In further embodiments of the method, the delaying is provided by a one-shot having a pulse width equal to the predetermined amount of time.

In some embodiments, a touch-sense device comprises: a sensing layer enabled to produce at least one sensor signal; a rough overlay on the sensing layer, sensing electronics electrically coupled to the at least one sensor signal; where the sensing layer is enabled, in response to a light press of a finger on the rough overlay, to produce a first change on the at least one sensor signal, and is further enabled, in response to a strong press of the finger on the rough overlay, to produce a second change on the at least one sensor signal; where the strong press applies more force to the rough overlay than the light press; and where the sensing electronics is enabled to distinguish the light press from the strong press due, at least in part, to the second change. According to various embodiments of the touch-sense device, one or more of: the strong press creates smaller airgaps between the rough overlay and the finger than the light press; and, the strong press, compared to the light press, reduces distance between the finger and the sensing layer. According to various embodiments of the touch-sense device, one or more of: the rough overlay forms a pattern of cavities on a touch surface of the sensing layer, the rough overlay comprises a touch surface of the sensing layer; and, the rough overlay is compliant and decreases distance between the finger and the sensing layer more with the strong press than with the light press. In some embodiments of the touch-sense device, the sensing layer comprises a capacitive sensor. In some embodiments of the touch-sense device, the touch-sense device comprises a touch pad. In some embodiments, the touch-sense device comprises a button. In some embodiments of the touch-sense device, the second change comprises a second edge on the at least one sensor signal. In some embodiments of the touch-sense device, the sensing electronics comprises a first threshold detector for detecting the first change, and a second threshold detector for detecting the second change.

In some embodiments, an apparatus having at least one capacitor comprises: structure for engaging a conductive surface, the structure for engaging configured to be contacted by the conductive surface with a non-zero force, to provide a first distance between the conductive surface and the at least one capacitor when the conductive surface is pressed against the means for engaging with a first level of the force, and to provide a second shorter distance between the conductive surface and the at least one capacitor when the conductive surface is pressed against the structure for engaging with a second greater level of the force; structure for sensing capacitance associated with the at least one capacitor, and structure for interpreting the sensed capacitance to determine whether the sensed capacitance has reached one or more capacitance thresholds. In some usage scenarios of the apparatus, the conductive surface comprises a surface of a finger.

In some embodiments, an apparatus having at least one capacitor comprises: means for engaging a conductive surface, the means for engaging configured to be contacted by the conductive surface with a non-zero force, to provide a first distance between the conductive surface and the at least one capacitor when the conductive surface is pressed against the means for engaging with a first level of the force, and to provide a second shorter distance between the conductive surface and the at least one capacitor when the conductive surface is pressed against the means for engaging with a second greater level of the force; means for sensing capacitance associated with the at least one capacitor, and means for interpreting the sensed capacitance to determine whether the sensed capacitance has reached one or more capacitance thresholds. In some usage scenarios of the apparatus, the conductive surface comprises a surface of a finger.

DESCRIPTION OF THE DRAWINGS

The invention may best be understood by reading the disclosure with reference to the illustrative embodiments of the drawings.

DETAILED DESCRIPTION

A detailed description of one or more embodiments of the invention is provided below along with accompanying figures of illustrative embodiments of the invention. The invention is described in connection with such embodiments, but the invention is not limited to any embodiment. The scope of the invention is limited only by the claims and the invention encompasses numerous alternatives, modifications and equivalents. Specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Touch-sense devices of various types are used as input devices for a variety of applications, such as personal computers, personal digital assistants, music players, appliances, cellular telephones, and other portable and non-portable devices. Touch-sense devices are used in a variety of form factors including buttons, sliders, touch pads, and touch screens. Touch-sense devices use a variety of sensing techniques alone or in combination, including mechanical, resistance, capacitance, current, surface acoustic wave, and other techniques. While specific applications, form factors, and sensing techniques are used as examples, the teachings herein are applicable to touch-sense devices used in a variety of applications, having a variety of form factors, and using a variety of sensing techniques.

Figure 1A:
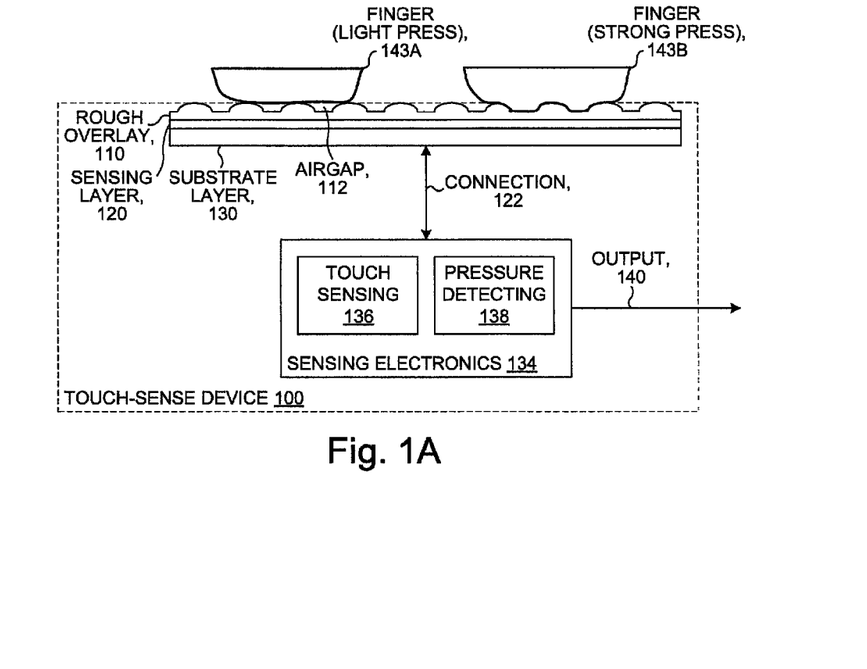
FIG. 1A illustrates selected details of an illustrative embodiment of a system including a rough overlay as part of a touch-sense device.

FIG. 1A illustrates selected details of an illustrative embodiment of a system including a rough overlay as part of a touch-sense device. Touch-sense device 100 includes sensing layer 120 coupled by connection 122 to sensing electronics 134. In various embodiments, sensing layer 120 is mounted on substrate layer 130. For example, in some embodiments substrate layer 130 comprises a printed circuit board, and sensing layer 120 comprises a plurality of power and ground traces on a top surface of the printed circuit board forming a capacitance-sensing layer. In further embodiments, sensing layer 120 and substrate layer 130 have holes and/or gaps to provide for backlighting. In other embodiments, the sensing layer is formed, at least in part, from a transparent conductive material, such as Indium Thin Oxide (ITO).

Connection 122 carries one or more sensor signals from sensing layer 120 to sensing electronics 134, optionally via substrate layer 130. In some embodiments, the sensing electronics are integrated into sensing layer 120 and/or into substrate layer 130, and connection 122 is an internal connection in sensing layer 120 and/or in substrate layer 130. In other embodiments, sensing layer 120 and/or substrate layer 130 includes a portion of sensing electronics 134. In still other embodiments, some or all of sensing electronics 134 are mounted on substrate layer 130 on a surface opposite that of sensing layer 120. As one example, in various embodiments, sensing layer 120 and/or substrate layer 130 includes logic to multiplex or otherwise combine sensor signals of sensing layer 120, and connection 122 includes control signals to select ones of the sensor signals to be sent to sensing electronics 134 over connection 122.

According to various embodiments, touch-sense device 100 is a button, a slider, a touch pad, a touch screen, or any other touch-sense device. Touching of and/or proximity to the sensing layer (directly, or indirectly through rough overlay 110), such as by a finger pressing lightly (as indicated by light finger press 143A) or a finger pressing more strongly (as indicated by strong finger press 143B), creates a change that is measured by sensing electronics 134 and reported on output 140. For example, in various embodiments, sensing layer 120 uses capacitive sensing, and proximity to the sensing layer produces a capacitance change that is measured by sensing electronics 134. In some embodiments, sensing electronics 134 includes touch sensing logic 136 that is enabled to detect the change.

Many techniques are known for constructing touch-sense devices, and the teachings herein are applicable to various touch-sense device techniques. According to various embodiments, there are different types of sensing layers and corresponding sensing electronics, including one or more of resistance sensing, capacitance sensing, surface acoustic wave sensing, and other touch-sense sensing techniques. There are different sub-types of some of the types of sensing layers and corresponding sensing electronics. For example, there are various techniques for capacitive touch-sense devices, and for associated sensing electronics operable with various types of capacitance-sensing sensing layers.

In a first example embodiment, the sensing layer includes one or more capacitors, such as an array of capacitors as part of a touch screen, whose values are repeatedly measured by the sensing electronics. For example, sensor signals from the sensing layer represent voltage across the capacitors, and the capacitance of each of the capacitors is measured by the sensing electronics as a change in the voltage over time. Proximity of an object, such as a finger, to the sensing layer affects the value of at least one of the capacitors, and the location of the affected capacitor(s) is reported as the location of the touch. (The explanation of FIG. 4B below provides further details of embodiments similar to this first example embodiment.)

Touch-sense device 100 further includes rough overlay 110. According to various embodiments, rough overlay 110 is placed, applied, affixed, part of, disposed on, or otherwise covers sensing layer 120. For example, in some embodiments rough overlay 110 is affixed to sensing layer 120 with an overlay adhesive. Rough overlay 110 changes a response of sensing layer 120 so that light finger press 143A is more distinguishable from strong finger press 143B by sensing electronics 134. In some embodiments, pressure detecting logic 138 is enabled to detect a difference between light finger press 143A and strong finger press 143B. In various embodiments, pressure detecting logic 138 is combined in whole or in part with touch sensing logic 136. For example, in some embodiments, pressure detecting logic 138 is separate from touch sensing logic 136, and separately uses one or more sensor signals sent over connection 122 to detect the changes in the response of sensing layer 120. In other embodiments, pressure detecting logic 138 is shared in part with touch sensing logic 136, such as by sharing one or more analog-to-digital converters. In still other embodiments, pressure detecting logic 138 is fully shared with touch sensing logic 136, such as by using a common micro-controller and other electronics (where, for example, differing parts of a program of the micro-controller perform the touch sensing and the pressure detecting).

Rough overlay 110 serves to make light finger press 143A more distinguishable from strong finger press 143B by pressure detecting logic 138. Without rough overlay 110, a difference in a sensor signal between light finger press 143A and strong finger press 143B may not be large enough, or may vary too much with finger orientation, to reliably distinguish light finger press 143A from strong finger press 143B. With rough overlay 110, light finger press 143A does not fully conform to a surface of touch-sense device 100 formed by rough overlay 110, leaving airgaps, such as airgap 112. Strong finger press 143B, however, due to effects such as skin deformation, does not leave airgaps and/or leaves substantially smaller airgaps.

For various types of sensing layers, the magnitude of a sensor signal responsive to touching and/or to proximity is proportional to one or more of touched area and distance from the sensing layer. For example, a capacitance-sensing sensing layer increases a measured capacitance proportional to increased touch area, and inversely proportional to distance. In some embodiments and/or usage scenarios, the touch area is related to finger orientation and/or to finger pressure, and the distance is proportional to a thickness of rough overlay 110 and/or to finger pressure. Accordingly, rough overlay 110 enables a capacitance-sensing sensing layer to produce a larger magnitude of difference in a sensor signal between light finger press 143A from strong finger press 143B than pressing directly on sensing layer 120. As illustrated in FIG. 1A, strong finger press 143B, due at least in part to skin deformation, provides more area in contact with rough overlay 110 and is closer to sensing layer 120 than light finger press 143A, advantageously producing a larger change in a sensor signal between light finger press 143A and strong finger press 143B than either pressing directly on sensing layer 120 or pressing on sensing layer 120 via a smooth overlay.

Output 140 includes one or more indications, and is, according to various embodiments, encoded in various ways. For example, in some embodiments output 140 includes one or more signals such as: a touch location indication (e.g., one or more values in respective ranges); a touch-sense signal indicating a touch was detected (and that the touch location indications are valid); and a strong-touch signal indicating that the touch was from a strong press (vs. from a light press).

In some embodiments and/or usage scenarios, a light press corresponds to a force of approximately 0.1-0.3 Newtons, and a strong press corresponds to a force of approximately 0.4-3 Newtons. The force thresholds for a light press vs. a strong press vary, according to various embodiments. For example, a commercial application such as a media player may have lower thresholds than an industrial application where accidentally registering a touch is potentially more consequential.

Figure 2:
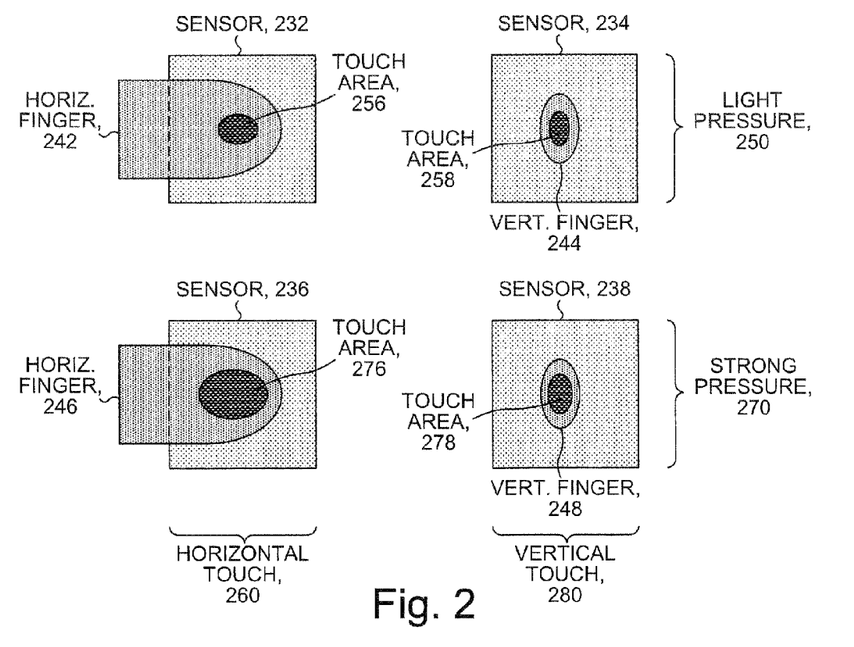
FIG. 2 illustrates examples of a finger touching a touch-sense device in different orientations and with differing amounts of applied pressure.

FIG. 2 illustrates examples of a finger touching a touch-sense device in different orientations and with differing amounts of applied pressure. Sensors 232, 234, 236, and 238 illustrated in FIG. 2 could be different sensors or sensing layers, or could be separate instances of use of a same sensor or sensing layer.

The upper row of FIG. 2 illustrates application of light pressure 250 to a sensing layer (such as sensing layer 120 illustrated in FIG. 1A), and the lower row of FIG. 2 illustrates application of strong pressure 270 to the sensing layer. The left column of FIG. 2 illustrates application of pressure by a finger (242, 246) in a horizontal (with respect to the sensor) position (horizontal touch 260), and the right column of FIG. 2 illustrates application of pressure by a finger (244, 248) in a vertical (with respect to the sensor) position (vertical touch 280). Accordingly, FIG. 2 has four examples of touching a sensor.

As illustrated in the upper left of FIG. 2, light pressure 250 by horizontal finger 242 produces a touch area 256, whereas in the lower left of FIG. 2, strong pressure 270 by horizontal finger 246 produces a relatively larger touch area 276.

As illustrated in the upper right of FIG. 2, light pressure 250 by vertical finger 244 produces a touch area 258, whereas in the lower right of FIG. 2, strong pressure 270 by vertical finger 248 produces a relatively not-much-larger touch area 278.

Further, comparing the upper left and the lower right of FIG. 2, light pressure 250 by horizontal finger 242 produces a touch area 256 that is comparable to that of strong pressure 270 by vertical finger 248.

For sensing layers where magnitude of a sensor signal of the sensing layer is proportional to the area of a touch, the examples of FIG. 2 illustrate the variations that are possible. Further, the examples of FIG. 2 illustrate that an amount of variation in area from light pressure to strong pressure varies with finger orientation.

Figure 4A:
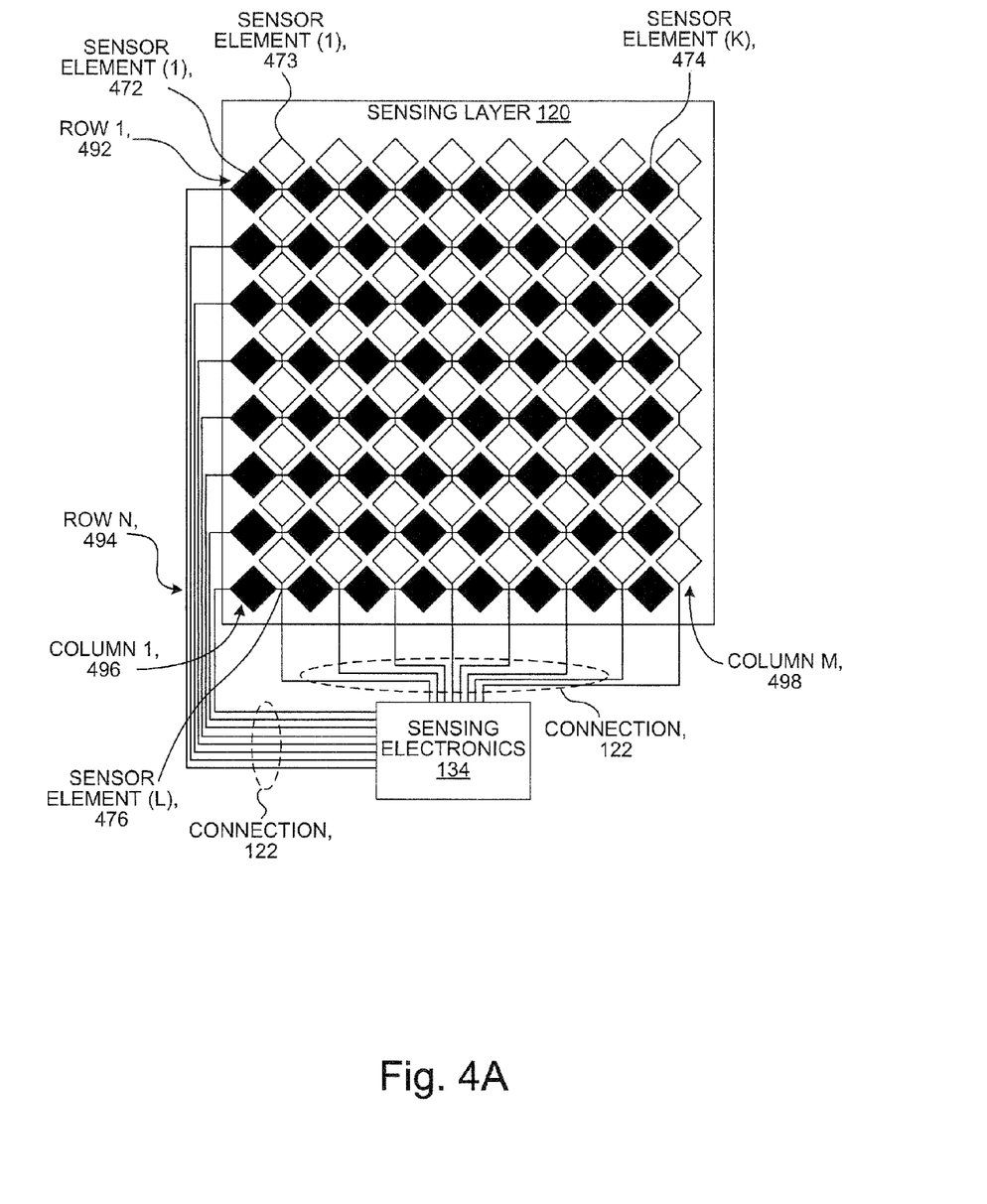
FIG. 4A illustrates selected details of an illustrative embodiment of a sensing layer and sensing electronics of a touch-sense, dual-coordinate, input device.

FIG. 4A illustrates selected details of an illustrative embodiment of a sensing layer and sensing electronics of a touch-sense, dual-coordinate, input device. As illustrated in FIG. 4A, sensing layer 120 is coupled to sensing electronics 134 by connection(s) 122. In some embodiments, sensing electronics 134 is a processing device, such as a Cypress Semiconductor CY8C20334 PSoC® Mixed-Signal Array. In various embodiments, connections 122 are conductive traces, such as traces on a printed circuit board.

Sensing layer 120 includes an array of pairs of sensor elements, such as the pair of sensor elements 472 and 473, and such as other sensor elements 474 and 476. In the example of FIG. 4A, the sensor elements are arranged in rows (such as row 492 and row 494) and columns (such as column 496 and column 498).

The sensor elements are connected to sensing electronics 134 by connection(s) 122. Sensing electronics 134 is enabled to measure capacitance across each of the pairs of sensor elements. For example, in some embodiments, the sensing electronics serially measures capacitance across each of the pairs of sensor element, and does so at very high rates so that multiple observations per second are obtained for each of the pairs of sensor elements. Proximity of a conductive surface, such as a finger, to sensing layer 120 changes effective capacitance of one or more of the pairs of sensor elements, and sensing electronics 134 is enabled to detect and to report the change in effective capacitance.

Of course, there are many embodiments of sensing layers and sensing electronics compatible with the techniques taught herein, and the example of FIG. 4A should not be construed as limiting the scope of possible sensing layers or sensing electronics.

Figure 4B:
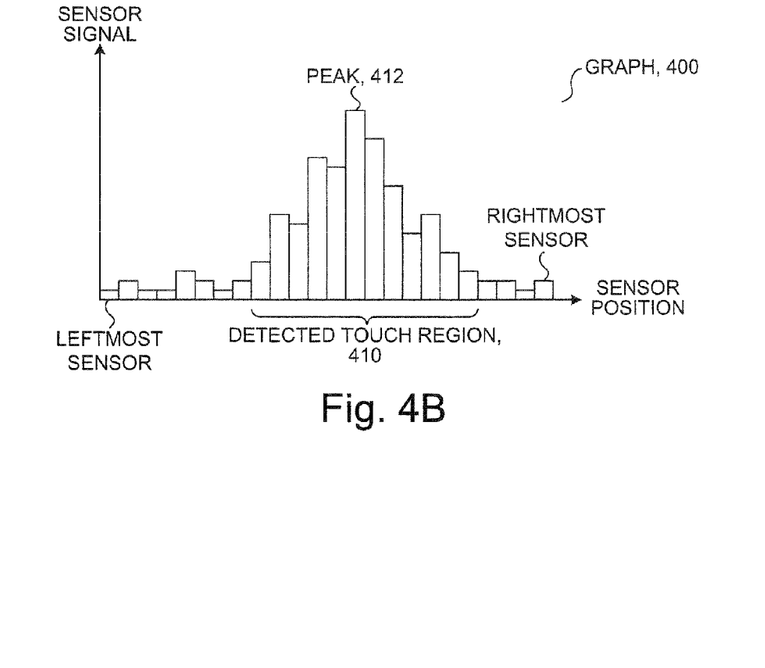
FIG. 4B illustrates an example of sensor readings vs. sensor position for a touch-sense device having an array of sensors.

FIG. 4B illustrates an example of sensor readings vs. sensor position for a touch-sense device having an array of sensors. In some embodiments, graph 400 illustrates values of sensor signals obtained from a linear array of sensors, such as from a touch-sense device that is a slider. In other embodiments, FIG. 4B illustrates values of sensor signals obtained from one dimension of sensors in a touch screen or touch pad having a two-dimensional array of sensors. For example, in some embodiments graph 400 corresponds to sensor signals obtained from a row of sensor elements, such as row 492 in FIG. 4A.

As illustrated in graph 400, in some usage scenarios touching of or proximity to a touch-sense device activates multiple sensors with varying magnitudes. In some embodiments, a region where a magnitude of sensor signals from the sensors is above a background average (such as a static threshold or a dynamic threshold) is reported as detected touch region 410. One or more of the sensor signals have a maximum value among all the sensor signals, such as indicated by peak 412. According to various embodiments, a reported location of the touch is the location of the sensor corresponding to peak 412, or is a location determined as a function of the sensor signals in detected touch region 410, such as a centroid of detected touch region 410.

In some embodiments, a selected one of the sensor signals in detected touch region 410 is processed, such as by pressure detecting logic 138 illustrated in FIG. 1A, to determine whether a touch is a light press or a strong press. In other embodiments, a function of one or more of the sensor signals in detected touch region 410 is processed to determine whether a touch is a light press or a strong press. For example, in some embodiments, a sum of all the sensor signals in detected touch region 410 is processed. In other embodiments, a weighted sum, such as a geometrically weighted sum, of all the sensor signals in detected touch region 410 is processed.

While the example of FIG. 4A is with respect to a single dimension, such as sensor signals obtained from a row or a column of sensor elements, the techniques herein are equally applicable in multi-dimensional embodiments, such as sensor signals obtained from a two-dimensional array of sensor elements.

Figure 5A:
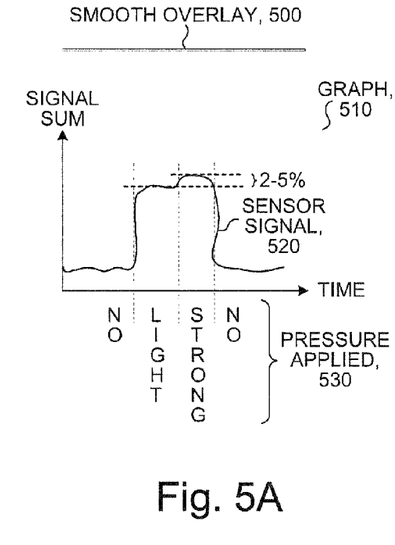
FIG. 5A illustrates an example of a sensor signal produced with a smooth overlay.
Figure 5B:
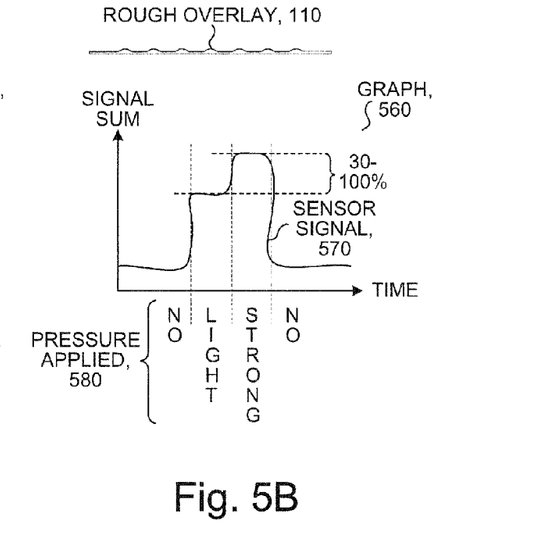
FIG. 5B illustrates an example of a sensor signal produced with a rough overlay.

FIG. 5A illustrates an example of a sensor signal produced with a smooth overlay, and FIG. 5B illustrates an example of a sensor signal produced with a rough overlay.

Graph 510 in FIG. 5A illustrates sensor signal 520 produced from smooth overlay 500. According to various embodiments, sensor signal 520 is an output of a single sensor, or a function of multiple sensors (as explained with regard to FIG. 4B). In FIG. 5A, as time increases along the X axis of graph 510, varying amounts of pressure are applied (pressure applied 530) to smooth overlay 500, starting with no pressure, then light pressure, then stronger pressure, and then returning to no pressure. As illustrated in graph 510, with smooth overlay 500 there is a very small difference in magnitude of sensor signal 520 between a light press and a strong press.

Graph 560 in FIG. 5B illustrates sensor signal 570 produced from rough overlay 110. According to various embodiments, sensor signal 570 is an output of a single sensor, or a function of multiple sensors (as explained with regard to FIG. 4B). In FIG. 5B, as time increases along the X axis of graph 560, varying amounts of pressure are applied (pressure applied 580) to rough overlay 110, starting with no pressure, then light pressure, then stronger pressure, and then returning to no pressure. As illustrated in graph 560, with rough overlay 110 there is a substantial difference in magnitude of sensor signal 570 between a light press and a strong press.

In some embodiments and/or usage scenarios, any strong press (even if not explicitly preceded by a light press) produces a sensor signal similar to that illustrated in graph 560. That is, the sensor signal has a first edge leading to a first plateau from an initial press, and then a second edge leading to a second plateau. One reason that two plateaus may occur in the sensor signal is a time lag between pressing and skin deformation (as illustrated by strong finger press 143B in FIG. 1A). In some embodiments, composition of rough overlay 110 (for example, compliant vs. non-compliant) affects a shape of the sensor signal and distinctness of the two plateaus. In further embodiments, such as embodiments that sample the sensor signal with an analog-to-digital converter, a frequency of sampling affects the observed shape of the sensor signal and the distinctness of the two plateaus.

Figure 6A:
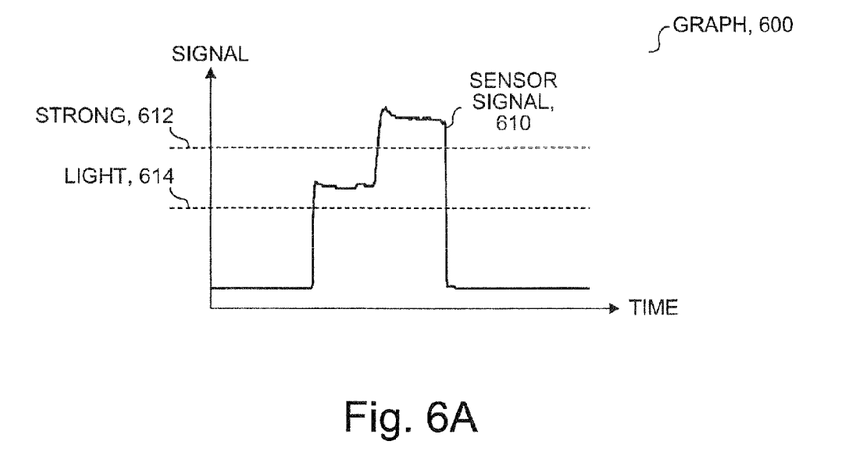
FIG. 6A illustrates an example of detecting light vs. strong press via magnitude of a sensor signal.

FIG. 6A illustrates an example of detecting light vs. strong press via magnitude of a sensor signal.

Graph 600 in FIG. 6A illustrates sensor signal 610 representative of a sensor signal produced with a rough overlay in response to a light press increasing to a strong press. In some embodiments, sensor signal 610 results from a pressure change with time, as illustrated in FIG. 5B. In further embodiments, a portion of sensor signal 610 results from a change over time, even with substantially constant pressure applied, due to effects such as skin deformation. According to various embodiments, sensor signal 610 is an output of a single sensor, or a function of multiple sensors (as explained with regard to FIG. 4B).

FIG. 6A also illustrates light press threshold 614 and strong press threshold 612. In some embodiments, when sensor signal 610 crosses light press threshold 614, a press that is at least a light press is detected. For example, light press threshold 614 is set high enough to distinguish background noise or false presses from real presses.

In some embodiments, when sensor signal 610 crosses strong press threshold 612, a strong press is detected. In further embodiments, a strong press is detected solely if strong press threshold 612 is crossed for at least a predetermined duration to avoid false detection.

According to various embodiments, light press threshold 614 and strong press threshold 612 are one or more of: static values set at a manufacturing or assembly time; static values set during a user calibration procedure; and dynamic values updated during operation. For example, in some embodiments, dynamic updating determines one or more of light press threshold 614 and strong press threshold 612 by evaluation of sensor signal 610 to determine current typical (e.g., average) magnitudes for the plateaus due to a light press and due to a strong press.

Figure 6B:
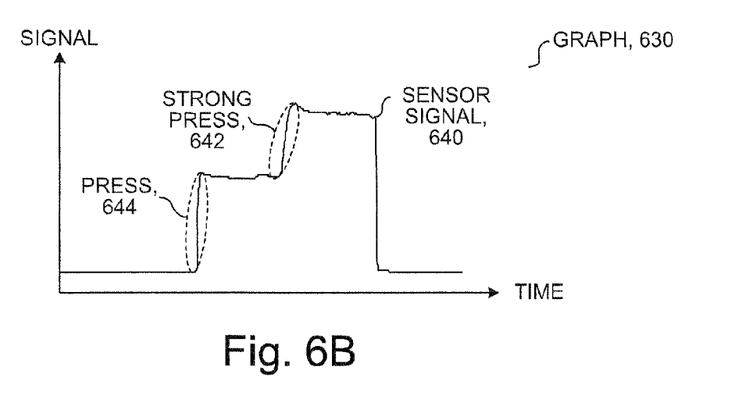
FIG. 6B illustrates an example of a sensor signal produced via a rough overlay subject to a strong press.
Figure 6C:
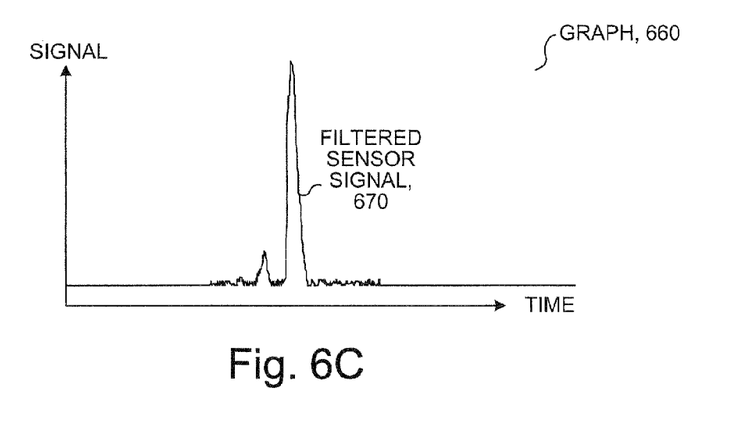
FIG. 6C illustrates an example of a filtered version of the sensor signal of FIG. 6B.

FIG. 6B illustrates an example of a sensor signal produced via a rough overlay subject to a strong press, and FIG. 6C illustrates a corresponding example of a filtered version of the sensor signal of FIG. 6B.

Graph 630 in FIG. 6B illustrates sensor signal 640 representative of a sensor signal produced with a rough overlay in response to a light press increasing to a strong press. In some embodiments, sensor signal 640 results from a pressure change with time, as illustrated in FIG. 5B. In further embodiments, a portion of sensor signal 640 results from a change over time, even with substantially constant pressure applied, due to effects such as skin deformation. According to various embodiments, sensor signal 640 is an output of a single sensor, or a function of multiple sensors (as explained with regard to FIG. 4B).

Graph 630 also illustrates strong press edge 642 of sensor signal 640 produced when the light press increases to the strong press. Graph 660 in FIG. 6C illustrates a result of filtering sensor signal 640, such as by pressure detection logic 138 (illustrated in FIG. 1B), producing filtered sensor signal 670. Filtered sensor signal 670 reports an occurrence of a "second" edge corresponding to strong press edge 642 of sensor signal 640.

Figure 1B:
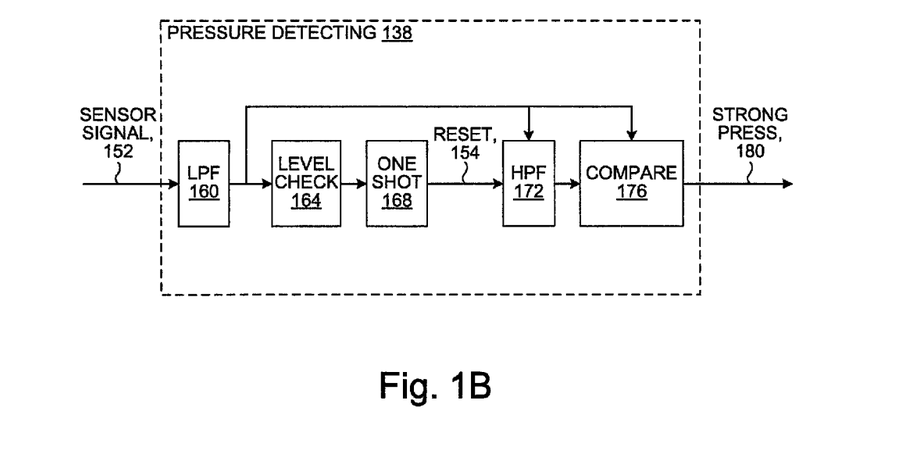
FIG. 1B illustrates selected details of an illustrative embodiment of pressure detecting logic.

FIG. 1B illustrates selected details of an illustrative embodiment of pressure detecting logic. In some embodiments, pressure detecting logic 138 is a portion of sensing electronics 134 as illustrated in FIG. 1A. The illustrative embodiment of pressure detecting logic 138 is enabled to detect a "second edge" on a sensor signal, such as strong press edge 642 of sensor signal 640 as illustrated in FIG. 6B. The output of pressure detecting logic 138 is strong press indication 180. In some embodiments, strong press indication 180 appears similar to filtered sensor signal 670 in FIG. 6C. In other embodiments, strong press indication 180 is converted to a binary signal and appears as a square pulse.

Pressure detecting logic 138 takes as input sensor signal 152. According to various embodiments, sensor signal 152 is an output of a single sensor, or a function of multiple sensors (as explained with regard to FIG. 4B). Low-pass filter 160 removes high-frequency noise from sensor signal 152, producing a low-pass filtered sensor signal. The low-pass filtered sensor signal is then compared (compare 176) with a high-pass filtered (high-pass filter 172) version of itself to produce strong press indication 180.

By only enabling high-pass filter 172 once a particular threshold is crossed, high-pass filter 172 does not detect a first edge due to an initial and/or a light press (such as press edge 644 as illustrated in FIG. 6B), and only detects a second edge due to a strong press (such as strong press edge 642 as illustrated in FIG. 6B). Level check 164 and one-shot 168 delay enabling high-pass filter 172 by detecting a threshold crossing on the low-pass filtered sensor signal (via level check 164), and enabling one-shot 168 in response to the threshold crossing to generate a reset pulse for a predetermined duration once the threshold is crossed. A width of the reset pulse, for example, corresponds to a typical duration of the first edge due to the light press (thus causing high-pass filter 172 to ignore the first edge).

Figure 7A:
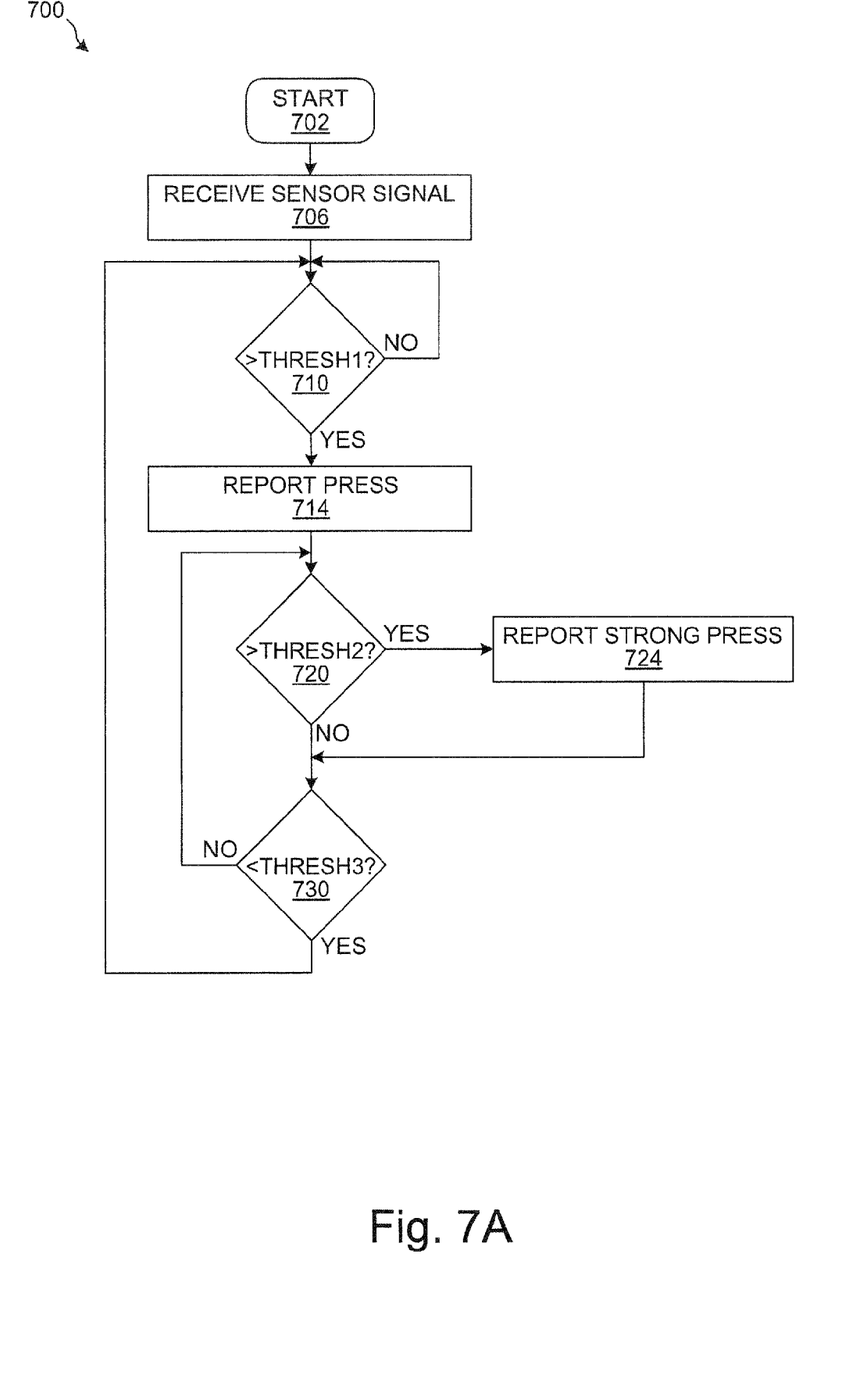
FIG. 7A illustrates selected details of a magnitude-based method of operating a touch-sense device.

FIG. 7A illustrates selected details of a magnitude-based method of operating a touch-sense device. In some embodiments, process 700 detects a sensor signal crossing one or more of light press threshold 614 and strong press threshold 612 as illustrated in FIG. 6A.

Process 700 starts ("Start" 702) and receives a sensor signal for processing ("Receive Sensor Signal" 706). According to various embodiments, the sensor signal is an output of a single sensor, or a function of multiple sensors (as explained with regard to FIG. 4B).

Process 700 then waits until the sensor signal exceeds a first threshold (">Threshold 1?" 710). Until the first threshold is exceeded, the sensor signal is presumed to contain background noise. When the first threshold is exceeded, a press is detected and reported ("Report Press" 714).

Process 700 then waits until the sensor signal either exceeds a second threshold (">Threshold 2?" 720), or falls below a third threshold ("<Threshold 3?" 730). If the sensor signal exceeds the second threshold, a strong press is detected and reported ("Report Strong Press" 724).

When the sensor signal falls below the third threshold, process 700 is effectively reset, and returns to wait for the sensor signal to exceed the first threshold (">Threshold 1?" 710). If the sensor signal falls below the third threshold without having exceeded the second threshold, solely a light press (and not a strong press) was detected. In some embodiments, the third threshold is the same as the first threshold. In other embodiments, the third threshold is at a different magnitude than the first threshold to provide hysteresis.

Process 700 reports both whether a press occurs ("Report Press" 714) and whether the press (if the press occurs) is a strong press ("Report Strong Press" 724). As such, in some embodiments, process 700 represents operation of sensing electronics 134 as illustrated in FIG. 1A, where detecting if the press occurs is determined by touch sensing logic 136, and detecting whether the press is a strong press is determined by pressure detecting logic 138.

Figure 7B:
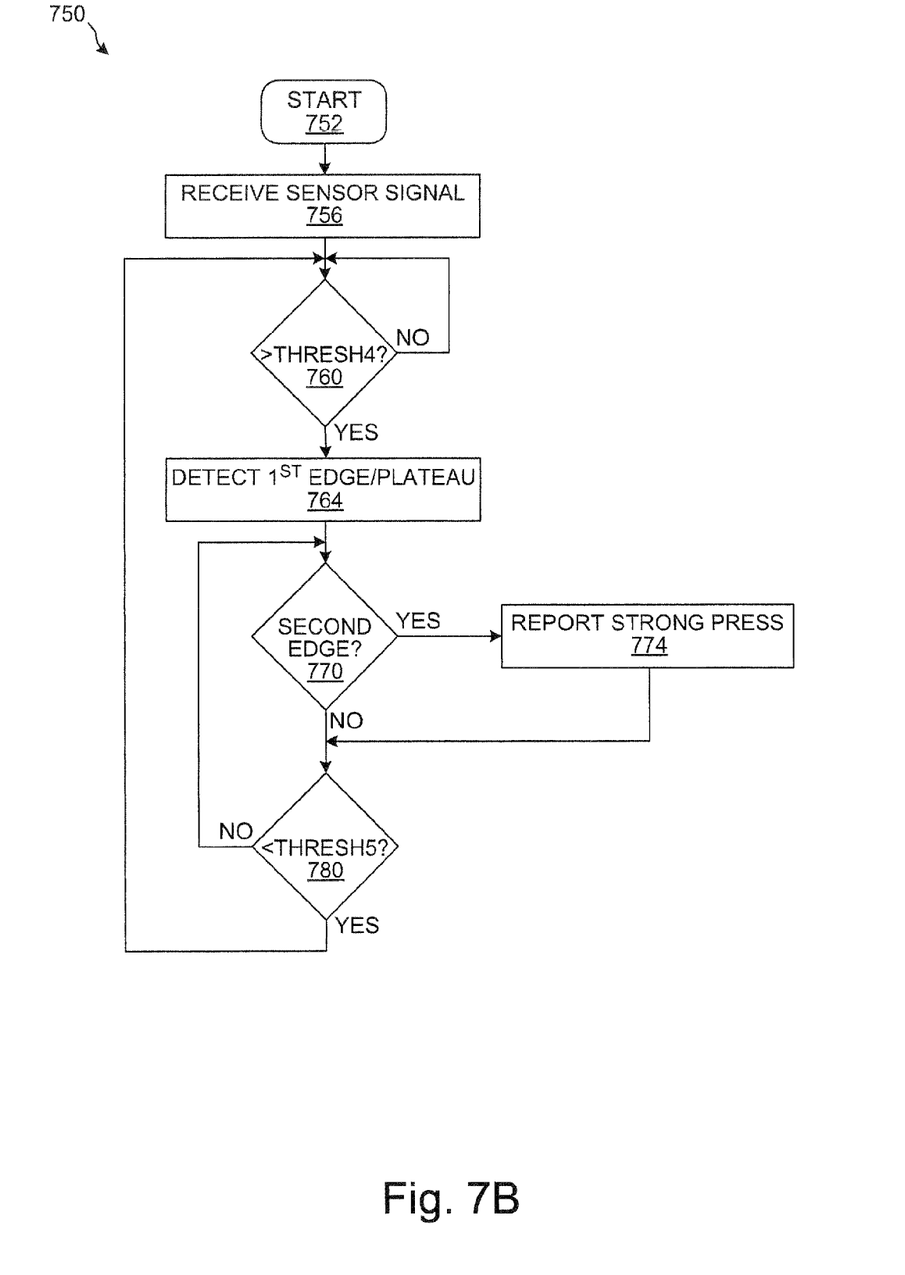
FIG. 7B illustrates selected details of an edge-based method of operating a touch-sense device.

FIG. 7B illustrates selected details of an edge-based method of operating a touch-sense device. In some embodiments, process 750 reports a strong press using a method similar to that of pressure detection logic 138 as illustrated in FIG. 1B. In various embodiments, process 750 detects a second edge on a sensor signal, such as strong press edge 642 of sensor signal 640 as illustrated in FIG. 6B.

Process 750 starts ("Start" 752) and receives a sensor signal for processing ("Receive Sensor Signal" 756). According to various embodiments, the sensor signal is an output of a single sensor, or a function of multiple sensors (as explained with regard to FIG. 4B).

Process 750 then waits until the sensor signal exceeds a fourth threshold (">Threshold 4?" 760). Until the fourth threshold is exceeded, the sensor signal is presumed to contain background noise. When the fourth threshold is exceeded, a first edge leading to a first plateau is detected ("Detect First Edge/Plateau" 764). In some embodiments, the process delays a specified amount of time after detecting that the fourth threshold is exceeded in order to ignore a remaining portion of the first edge after the fourth threshold is exceeded.

Process 750 then waits until the sensor signal either has a second edge ("Second Edge?" 770), or falls below a fifth threshold ("<Threshold 5?" 780). If a second edge is detected, a strong press is detected and reported ("Report Strong Press" 774).

When the sensor signal falls below the fifth threshold, process 750 is effectively reset, and returns to wait for the sensor signal to exceed the fourth threshold (">Threshold 4?" 760). If the sensor signal falls below the fifth threshold without having detected the second edge, solely a light press (and not a strong press) was detected. In some embodiments, the fifth threshold is the same as the fourth threshold. In other embodiments, the fifth threshold is at a different magnitude than the fourth threshold to provide hysteresis.

Process 750 reports whether a press (if a press occurs) is a strong press ("Report Strong Press" 774). As such, in some embodiments, process 750 represents operation of pressure detecting logic 138 of sensing electronics 134 as illustrated in FIG. 1A. In various embodiments, separate logic, such as touch sensing logic 136, reports whether the press occurs.

Figure 3A:
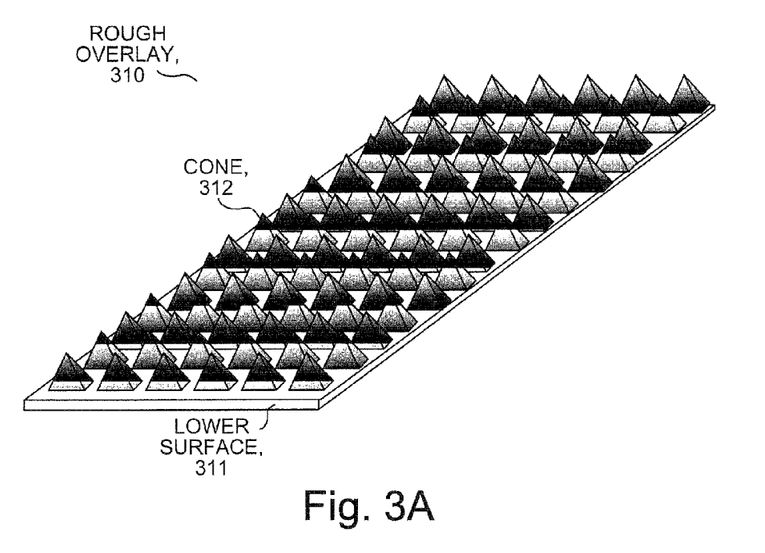
FIG. 3A illustrates selected details of an illustrative embodiment of a rough overlay of a touch-sense device.

FIG. 3A illustrates selected details of an illustrative embodiment of a rough overlay of a touch-sense device. Rough overlay 310 is illustrated as having flat lower surface 311 for coupling to a sensing layer, such as sensing layer 120 as illustrated in FIG. 1A. Of course, in various embodiments, rough overlay 310 has a variety of shapes and planarities to match a shape and a planarity of an associated sensing layer. For example, in some embodiments, the sensing layer and the corresponding overlay are round and are used as part of a circular slider touch-sense device.

Rough overlay 310 is illustrated as having an upper surface comprising an array of cones (or pyramids), such as cone 312. According to various embodiments, the cones are in a regular or an irregular array, the cones are uniform or non-uniform in size, the cones have pointed, rounded, or squared off tops, and the cones abut at their bases or are separated (have clearance) at their bases (independently in each of the X and Y dimensions). In some embodiments, the cones are approximately 2 mm in diameter and have a height of approximately 1.5 mm.

In various embodiments, the cones are cavities, and descend into the surface of rough overlay 310 rather than protrude above the surface. Surfaces with cavities may have a better "feel" to a finger, whereas surfaces with protrusions may better distinguish a light press vs. a strong press.

There is no implied limitation to the protrusions or the cavities having a specific shape, such as cones. According to various embodiments, any type or combination of shapes, such as for example squares or hexagons or hemispheres, are used. In further embodiments, the shapes form one or more continuous lines, rather than being discrete. For example, in some embodiments, the shapes are rills or ridges, arranged in one or more lines, spirals, or other configurations.

Figure 3B:
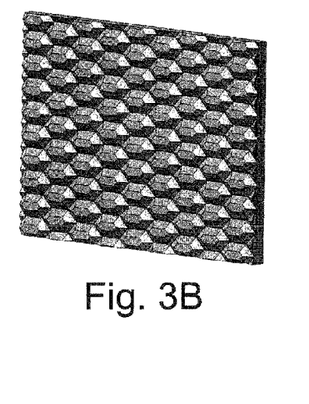
FIGS. 3B-3G illustrate example surfaces of a rough overlay of a touch-sense device.
Figure 3C:
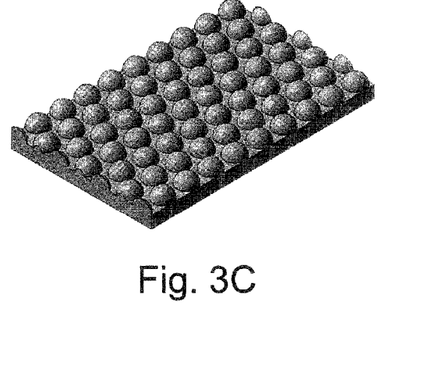
Figure 3D:
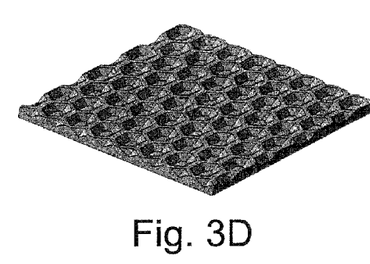
Figure 3E:
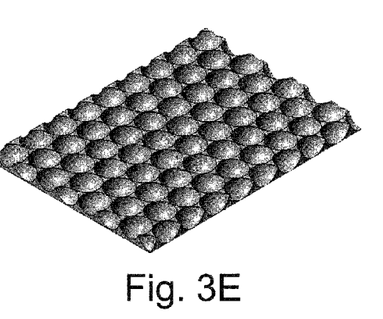
Figure 3F:
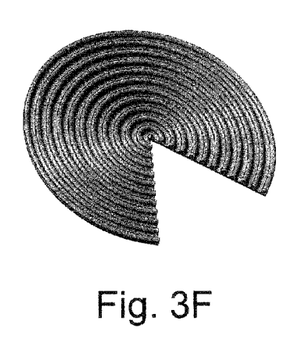
Figure 3G:
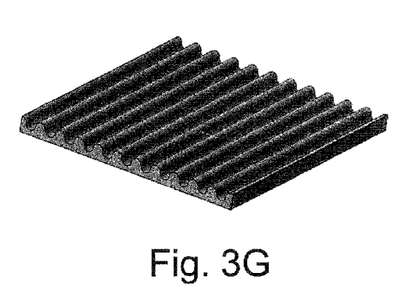

FIGS. 3B-3G illustrate example surfaces of a rough overlay of a touch-sense device. According to various embodiments, rough overlay 310 has a surface similar to that illustrated in any of FIGS. 3B-3G. The examples of FIGS. 3B and 3D illustrate pyramidal surface features, the examples of FIGS. 3C and 3E illustrate hemispherical surface features, and the examples of FIGS. 3F and 3G illustrate two of many other types of surface features. The examples of FIGS. 3B, and 3C illustrate surfaces with protrusions, the examples of FIGS. 3D and 3E illustrate surfaces with cavities, and the examples of FIGS. 3F and 3G illustrate surfaces with ridges. The examples of FIGS. 3B and 3E illustrate compaction (lack of clearance between) the surface features, and the examples of FIGS. 3C and 3D illustrate clearance between the surface features. The example of FIG. 3F illustrates a round surface, such as might be used with a circular slider touch-sense device. The examples of FIGS. 3B-3G are merely illustrative of some of the variety of surface features and should not be construed as limiting the scope of possible surface features of a rough overlay.

In various embodiments, rough overlay 310 is made of an insulating material, such as glass, plastic, plexiglass, FR4 or other printed circuit board material, rubber, or any combination thereof. A thickness of rough overlay 310 depends on a dielectric constant of the insulating material, as well as a type and a use model of the touch-sense device. For example, if the touch-sense device is used with gloved hands, rough overlay 310 should be less thick than for use with bare hands.

In some embodiments, rough overlay 310 is non-compliant (relatively incompressible), as a non-compliant surface increases skin deformation, thus increasing area difference between a light press and a strong press. In other embodiments, rough overlay 310 is compliant (at least partially compressible), as a compliant surface deforms more with a strong press, decreasing a distance between an object (such as a finger) and a sensing layer. Rough overlay 310 optionally provides electro-static discharge (ESD) protection for a sensing layer, such as sensing layer 120 as illustrated in FIG. 1A. In some embodiments, Rough overlay 310 is opaque, while in other embodiments rough overlay 310 is translucent to enable back-lighting of a touch-sense device.

A choice of material for rough overlay 310 depends on factors such as features, type and form-factor of the touch-sense device, a type or features of sensing electronics, how and where the touch-sense device is used, desired longevity (number of uses) of the touch-sense device, and other factors. Desirable features of rough overlay 310 include that it is pleasant to the touch, and that it be durable.

The examples above of rough overlay 310 are not intended to be limiting, nor is the term "rough overlay" intended to be limiting. One feature of rough overlay 310 is that the upper surface enables a light press to produce a more measurably different magnitude in a sensor signal of an associated sensor layer than a strong press, and there are various ways to produce the more measurably different magnitude based on the teachings herein. For example, an overlay that is smooth but is compliant is enabled to produce a measurably different magnitude in a sensor signal due to a strong press vs. a light press, and is thus considered to be a "rough overlay" with respect to the teachings herein.

One of skill in the art will recognize that the concepts taught herein can be tailored to a particular application in many other advantageous ways. In particular, those skilled in the art will recognize that the illustrated embodiments are but some of many alternative implementations that will become apparent upon reading this specification.

The preceding embodiments are exemplary and not restrictive. Although the specification may refer to "an", "one", "another", or "some" embodiment(s) in several locations, this does not necessarily mean that each such reference is to the same embodiment(s), or that any features described apply only to specific embodiments.

The invention claimed is:

1. A method of operating a touch-sense device comprising:

computing a function of one or more sensor signals from the touch-sense device;

detecting a threshold crossing on the function of the one or more sensor signals, the threshold crossing corresponding to sensing a first capacitance in response to a light press on a surface of the touch-sense device, wherein the surface comprises a rough overlay comprising insulating material;

subsequent to detecting the threshold crossing, detecting an event on the function of the one or more sensor signals based on a comparison of a high-pass filtered version and a low-pass filtered version of the one or more sensor signals, the high-pass filtering being enabled subsequent to the threshold crossing, the comparison identifying a sensor signal edge generated in response to a strong press made on the rough overlay of the touch-sense device, the sensor signal edge being generated based on a change in a magnitude of the function of the one or more sensor signals and a transition from the first capacitance to a second capacitance associated with an increased conformance of a finger with the rough overlay;

where the strong press applies more force to the rough overlay of the touch-sense device than the light press;

where the strong press conforms more to the rough overlay than the light press without creating airgaps between the rough overlay and the finger; and reporting, in response to the detecting the event, the strong press.

2. The method of claim 1, where a magnitude of difference between a first threshold of the function of the one or more sensor signals corresponding to the light press and a second threshold of the function of the one or more sensor signals corresponding to the strong press is due, at least in part, to the rough overlay of the surface of the touch-sense device.

3. The method of claim 1, where the threshold crossing comprises a first threshold crossing, and the detecting of the event further comprises a second threshold crossing.

4. The method of claim 1, where the detecting of the event comprises detecting an edge on the function of the one or more sensor signals.

5. The method of claim 1, further comprising delaying for a predetermined amount of time after the detecting the threshold and before the detecting the event.

6. The method of claim 5, where the delaying is provided by a one-shot having a pulse width equal to the predetermined amount of time.

7. A touch-sense device comprising:

a sensing layer enabled to produce at least one sensor signal;

a rough overlay on the sensing layer, wherein the rough overlay comprises insulating material;

sensing electronics electrically coupled to the at least one sensor signal;

where the sensing layer is enabled, in response to a light press of a finger on the rough overlay, to produce a first change on the at least one sensor signal indicative of a first change in capacitance, and is further enabled, in response to a strong press of the finger on the rough overlay, to produce a second change on the at least one sensor signal indicative of a second change in capacitance generated based on an increased conformance of the finger with the rough overlay, the second change being an event on a function of the at least one sensor signal, the event being detected based on a comparison of a high-pass filtered version and a low-pass filtered version of the one or more sensor signals, the high-pass filtering being enabled subsequent to the threshold crossing, the comparison identifying a sensor signal edge generated based on a transition from a first capacitance associated with the first change in capacitance to a second capacitance generated based on the strong press;

where the strong press applies more force to the rough overlay than the light press without creating airgaps between the rough overlay and the finger; and where the sensing electronics is enabled to distinguish the light press from the strong press due, at least in part, to the second change.

8. The device of claim 7, where the rough overlay forms a pattern of cavities on a touch surface of the sensing layer.

9. The device of claim 7, where the rough overlay and the sensing layer form a monolithic touch surface of the touch-sense device.

10. The device of claim 7, where the rough overlay is compliant and decreases distance between the finger and the sensing layer more with the strong press than with the light press.

11. The device of claim 7, where the strong press, compared to the light press, reduces distance between the finger and the sensing layer.

12. The device of claim 7, where the sensing layer comprises a capacitive sensor.

13. The device of claim 7, where the touch-sense device comprises a touch pad.

14. The device of claim 7, where the touch-sense device comprises a button.

15. The device of claim 7, where the sensing electronics comprises a first threshold detector for detecting the first change, and a second threshold detector for detecting the second change.

* * * * *